United States Patent
Tulloch et al.

(10) Patent No.: US 6,963,591 B2
(45) Date of Patent: Nov. 8, 2005

(54) SOLID STATE SYSTEM AND METHOD FOR GENERATING ULTRAVIOLET LIGHT

(75) Inventors: William Michael Tulloch, San Jose, CA (US); Alan Reilly Fry, San Jose, CA (US); Jeremy Weston, San Jose, CA (US); William Eugene White, Campbell, CA (US); Eric Alan Wilson, Morgan Hill, CA (US)

(73) Assignee: Coherent, Inc., Santa Clara, CA (US)

( * ) Notice: Subject to any disclaimer, the term of this patent is extended or adjusted under 35 U.S.C. 154(b) by 23 days.

(21) Appl. No.: 10/924,723

(22) Filed: Aug. 24, 2004

(65) Prior Publication Data

US 2005/0094682 A1 May 5, 2005

Related U.S. Application Data

(63) Continuation of application No. 10/147,941, filed on May 15, 2002, now Pat. No. 6,816,520.
(60) Provisional application No. 60/337,279, filed on Nov. 30, 2001.

(51) Int. Cl.$^7$ .................................. H01S 3/10
(52) U.S. Cl. ........................... 372/22; 372/21
(58) Field of Search .................. 372/20–22, 25, 372/70

(56) References Cited

U.S. PATENT DOCUMENTS

| | | | |
|---|---|---|---|
| 5,313,485 A | 5/1994 | Hamil et al. | 372/70 |
| 5,745,284 A * | 4/1998 | Goldberg | 359/344 |
| 6,246,707 B1 | 6/2001 | Yin et al. | 372/25 |
| 6,327,281 B1 | 12/2001 | Yin | 372/22 |
| 6,587,487 B2 | 7/2003 | Yin | 372/22 |
| 6,816,520 B1 * | 11/2004 | Tulloch et al. | 372/22 |

* cited by examiner

Primary Examiner—Minsun Oh Harvey
Assistant Examiner—James Menefee
(74) Attorney, Agent, or Firm—Stallman & Pollock LLP

(57) ABSTRACT

Infrared laser light generated by a solid state diode pumped transform-limited Ti:Sapphire laser is converted to UV wavelengths using third and fourth harmonic generation systems. The resulting output is tunable between approximately 187 and 333 nm. The combined solid state Ti:Sapphire laser and harmonic generation system includes feedback mechanisms for improved power and wavelength stability. The system can operate at pulse repetition rates of several thousand Hertz.

11 Claims, 13 Drawing Sheets

SOLID STATE SYSTEM AND METHOD FOR GENERATING ULTRAVIOLET LIGHT

CROSS-REFERENCE TO RELATED APPLICATIONS

Figure 1:
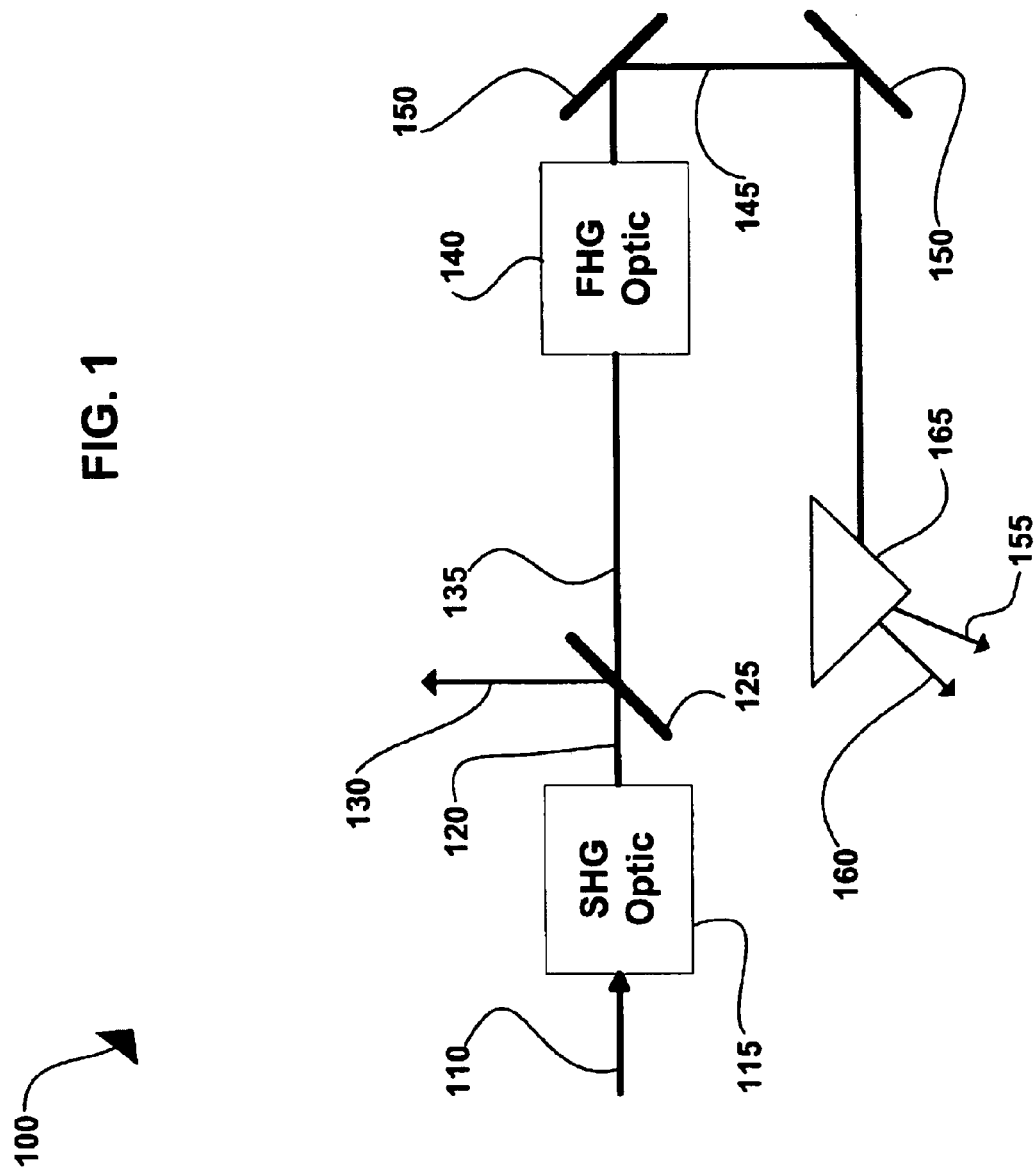

This a continuation of U.S. patent application Ser. No. 10/147,941, filed May 15, 2002, now U.S. Pat. No. 6,816,520, which claimed priority from U.S. Provisional Patent Application No. 60/337,279 by William M. Tulloch et al., entitled "Solid State System and Method for Generating Ultraviolet Light," filed Nov. 30, 2001, the disclosure of which is herein incorporated by reference.

BACKGROUND

1. Field of the Invention

The present invention relates to the generation of laser light and more specifically to the generation of tunable laser light in the ultraviolet region of the electromagnetic spectrum.

2. Description of the Prior Art

Lasers can be categorized by the regions of the electromagnetic spectrum in which they operate. These regions include the infrared (IR), visible (Vis.), and ultraviolet (UV). Each region can be further divided into regions such as the near infrared (NIR) and vacuum ultraviolet (VUV). The greatest number of laser light sources are found in the IR and visible regions of the spectrum while fewer options are available in the UV and VUV regions.

The UV region is important because photons of these wavelengths contain enough energy to break chemical bonds and because short wavelengths can be focused more precisely than longer wavelengths. UV light sources are used in applications such as spectroscopy, optical testing, medicine, machining, and lithography. For example, ArF and KrF excimer lasers are frequently used for lithography in the semiconductor industry. The short wavelengths of these lasers' outputs enable high resolution in the resulting image. Unfortunately, these lasers have significant disadvantages including the use of toxic gasses, poor beam quality, poor power stability, and relatively broad linewidths. In large-scale applications their optical components can also be very expensive. There is, therefore, a great need for alternative light sources and calibration standards at UV wavelengths.

Common UV sources include excimer lasers and systems that rely upon the harmonic conversion of light from sources in the visible or IR regions. Excimers include ArF, KrF, and $F_2$ gas lasers that generate light at approximately 193, 248, and 157 nm respectively. Also available is the $N_2$ gas laser with an output near 337 nm.

Harmonic generation provides an alternative to direct generation of ultraviolet light. In this approach light is produced in the visible or IR regions and then converted to shorter wavelengths using non-linear optics such as birefringent crystals or gases. The shorter wavelengths are exact harmonics or differences between input wavelengths. Harmonic generation requires relatively high power input sources to produce higher harmonics because harmonic generation is a relatively inefficient non-linear process. Traditional input sources for harmonic generation systems include Nd:YAG, Nd:YLF, IR diode, $CO_2$, and dye lasers.

UV sources that employ harmonic generation are generally limited by the original light sources whose fundamental outputs are typically at wavelengths above 1 micron. For example Neodymium lasers (1.064, 1.047, and 1.0535 $\mu$m) produce light at fixed wavelengths and cannot be tuned to produce harmonics at desirable 248 and 193 nm outputs. Tunable systems such as dye lasers and Alexandrite lasers also have disadvantages. Dye lasers, for example, are less powerful, more complex, and more difficult to operate than direct UV sources. Alexandrite based laser systems can provide outputs between 700 and 818 nm. However, these system are severely limited with respect to their maximum power output and repetition rates.

SUMMARY OF THE INVENTION

In the present invention the output of a transform-limited Ti:Sapphire laser is modified through the use of a solid-state harmonic generation system. Using third and forth harmonic generation, the output wavelengths are tunable to wavelengths less than 333 nm and preferably between approximately 187 and 333 nm. In one embodiment the Ti:Sapphire laser is pumped via a frequency-doubled diode pumped Nd:YLF laser. Frequency selection is optionally achieved by injection locking the Ti:Sapphire oscillator with a CW external cavity diode laser. These components provide a completely solid state and tunable light source in the important ultraviolet region of the electromagnetic spectrum.

The combination of the Ti:Sapphire system with harmonic generation results in a number of unique advantages found in particular embodiments. These include the ability to stabilize the power and wavelength of the second, third, and fourth harmonics of the Ti:Sapphire oscillator by monitoring the oscillator's output. Feedback mechanisms provide improved short and long-term stability. The Nd:YLF laser can operate at rapid repetition rates (i.e. up to and beyond 5 kHz) and, thus, reduce the peak power of individual pulses in the harmonic generation system without reducing the average power output. This increases the maximum average power output and extends the lifetime of optics within the harmonic generator and overcomes significant disadvantages of prior art systems.

Applications of the tunable UV output include optical testing and specifically testing optics intended for use in excimer lasers at 193 and 248 nm. The output can also be used as a seed source for excimer systems in order to narrow the bandwidth of the excimer output. Other applications include UV spectroscopy, laser machining, medicine (modification of living materials), and wavelength calibration.

Fifth harmonic generation is optionally employed to achieve laser output below 187 nm and in the vacuum ultraviolet.

In pulsed laser systems with a frequency conversion stage, higher average energies are typically achieved by increasing the energy input per pulse at the conversion stage. Unfortunately, higher per pulse input energies often result in shorter operational lifetimes of the conversion stage—such as the life time of a fourth harmonic generating crystal.

Embodiments of the invention include a system capable of producing laser light pulses at rapid repetition rates. These rapid repetition rates are optionally used to achieve higher average energies without increasing per pulse input energies to the degree required in the prior art.

In laser and optical systems there are often tradeoffs between performance parameters. For example, the current market driven performance parameters for a 193 nm laser required average powers greater than 2 mW while maintaining extended crystal lifetimes (greater than 1 hr). Prior art use of the FHG harmonics package results in 193 nm average powers below 1 mW at 1 kHz, and crystal lifetimes of less than 1 hour. As described herein, embodiments of the invention are capable of generating average powers above 2 mW with crystal lifetimes greater than 10 hours.

One embodiment of the invention includes a system for generating light with a wavelength of less than 333 nanometers. The system includes a Ti:Sapphire oscillator configured to generate a first output light, a harmonic generator disposed to receive a portion of the first output light, and configured to generate a second output light with a wavelength of less than 333 nanometers. The second output is optionally produced at a pulse repetition rate greater then 100 Hz and the Ti:Sapphire oscillator is optionally pumped by a solid state laser.

One embodiment of the invention includes a system for generating light with a wavelength of less than 250 nanometers. This system includes a Ti:Sapphire oscillator configured to generate a first output light, a fourth harmonic generating optic, and a harmonic generator, including the fourth harmonic generating optic, for receiving a portion of the first output light, and for generating a second output light with wavelength of less than 250 nanometers and equal to one fourth of a wavelength of the first output light. This system is capable of generating the second output at a pulse repetition rate greater than 1000 Hz. The second output is optionally tunable.

An embodiment of the invention includes a method of generating light with a wavelength of less than 333 nanometers including the steps of generating a first output light using a Ti:Sapphire oscillator, and generating a second light output with a wavelength of less than 333 nanometers using a harmonic generator disposed to receive a portion of the first output light.

An embodiment of the invention includes a method for generating light with a wavelength of less than 250 nanometers comprising the steps of using a Ti:Sapphire oscillator to generate a first output light, receiving a portion of the first output light with a harmonic generator, the harmonic generator including a fourth harmonic generating optic, and generating a second output light with wavelength of less than 250 nanometers using the forth harmonic generating optic. This embodiment optionally includes tuning the second output light to a desired wavelength.

BRIEF DESCRIPTION OF THE VARIOUS VIEWS OF THE DRAWING

Figure 2:
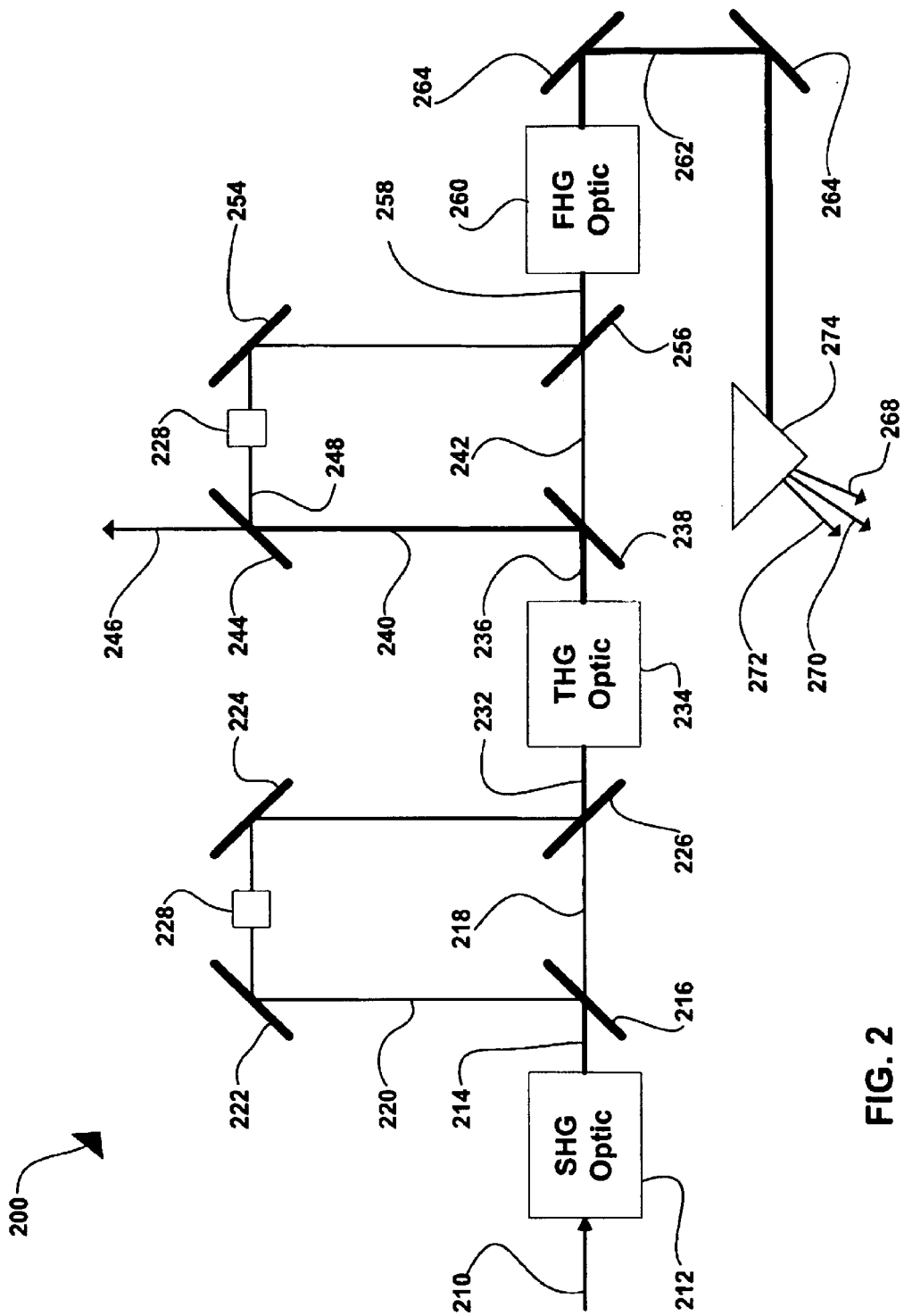
Figure 3:
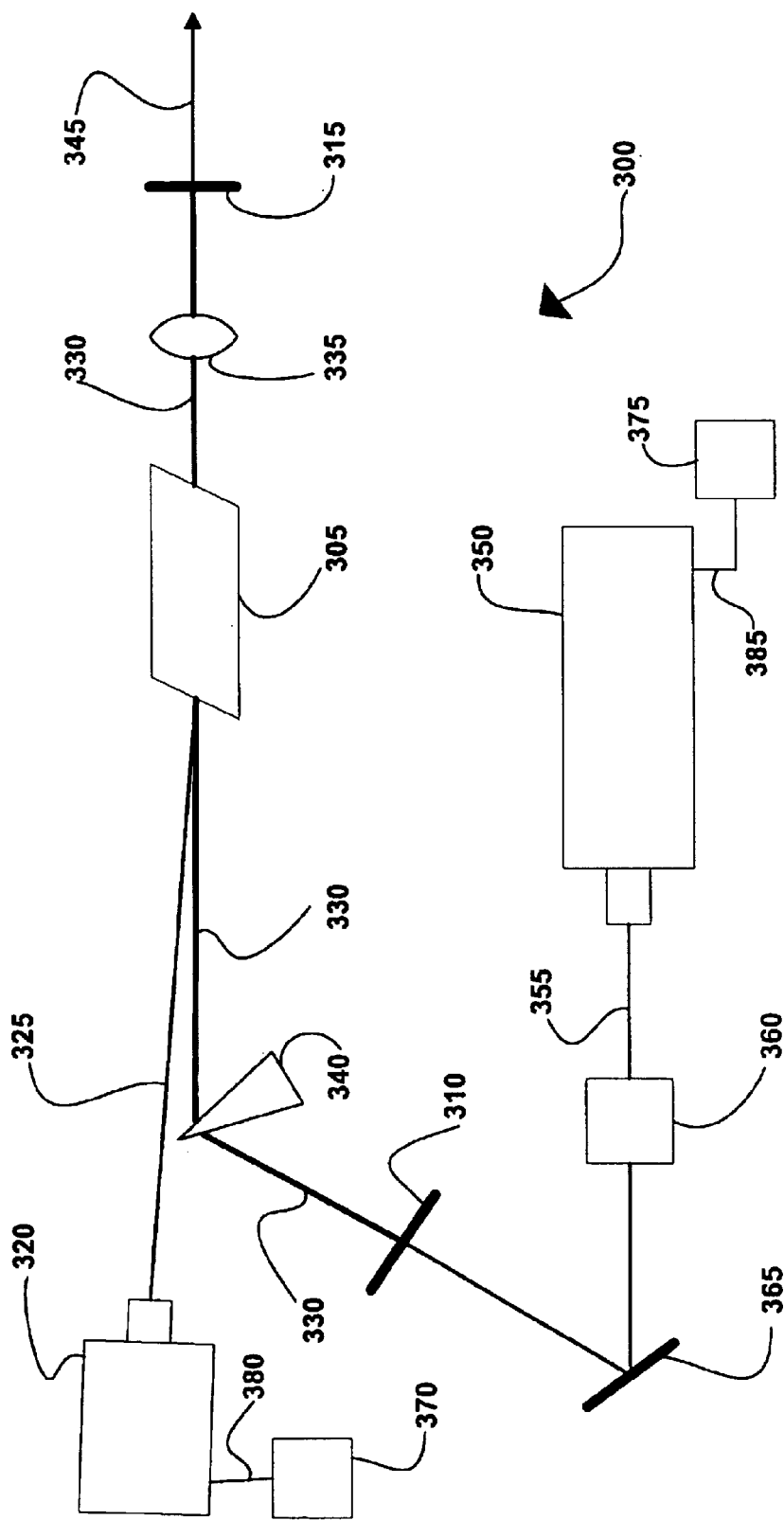
Figure 4:
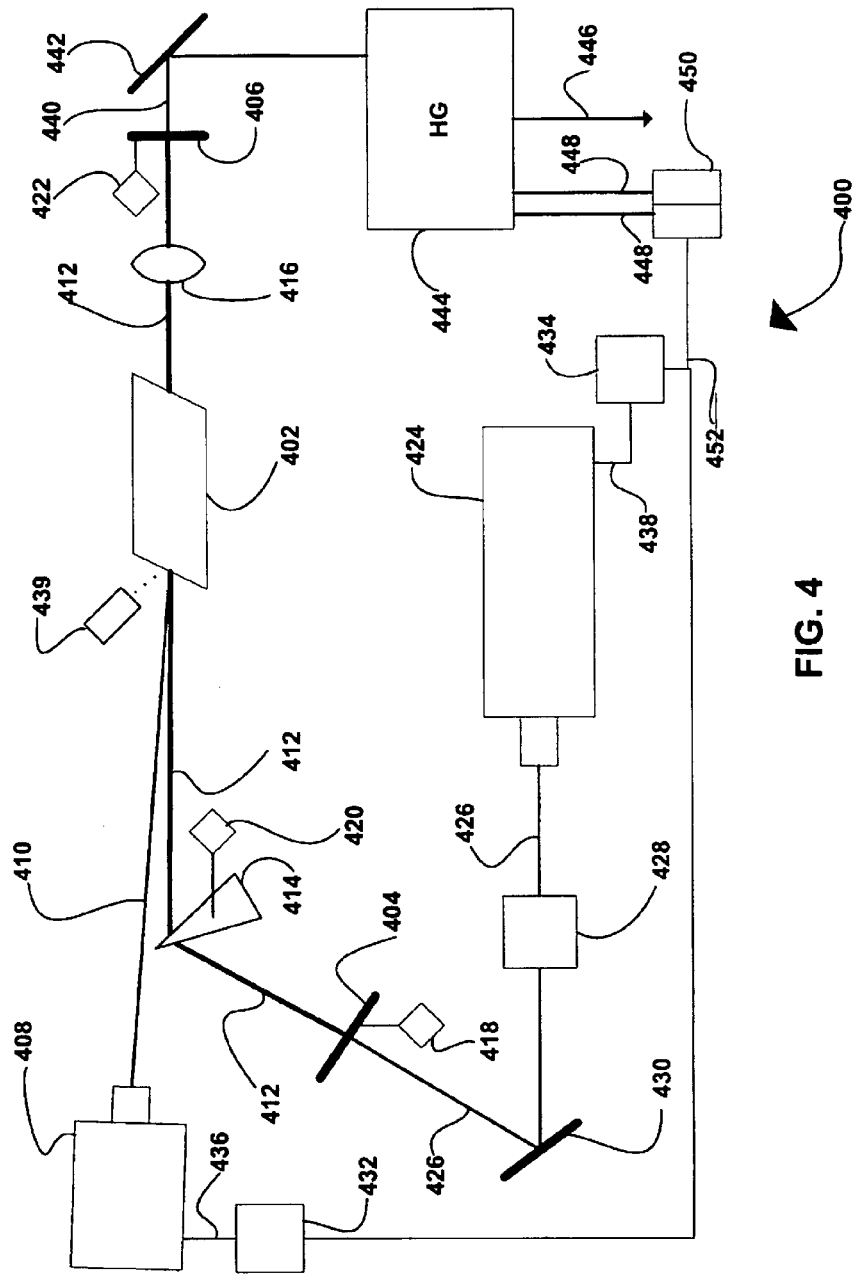
Figure 5:
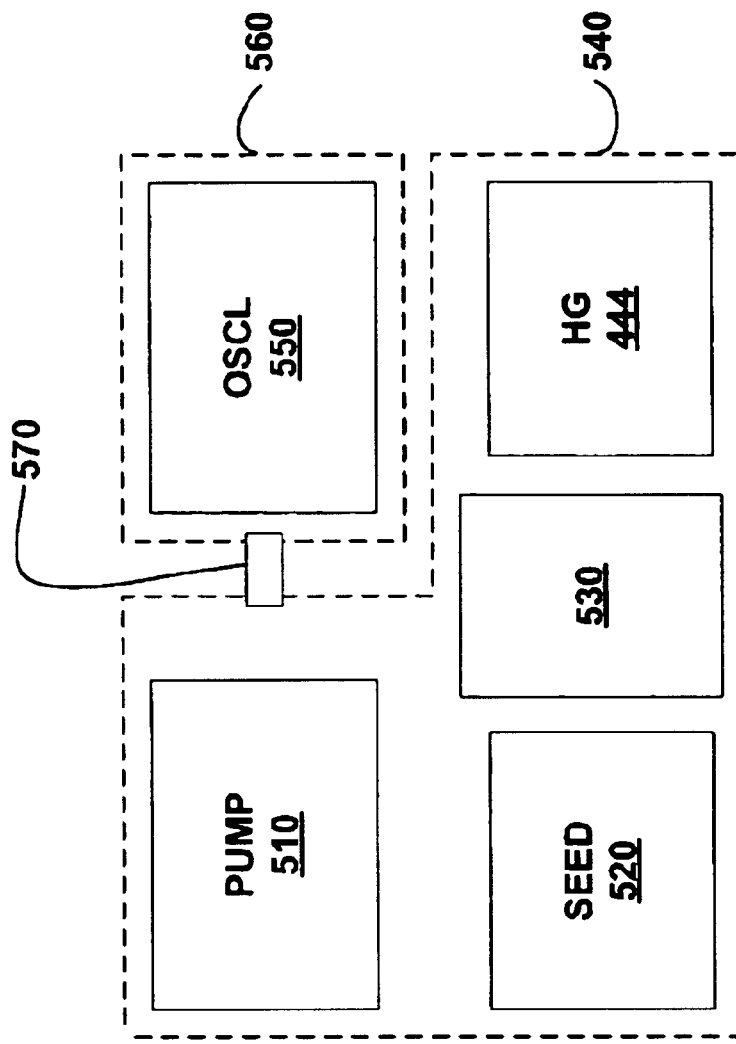
Figure 6:
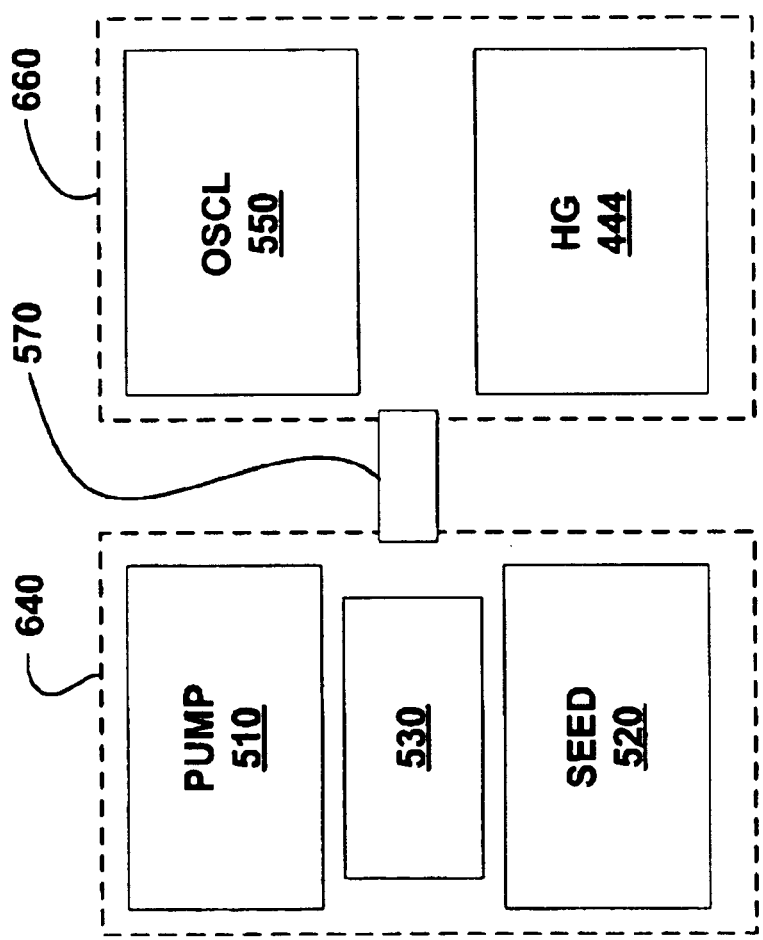
Figure 7:
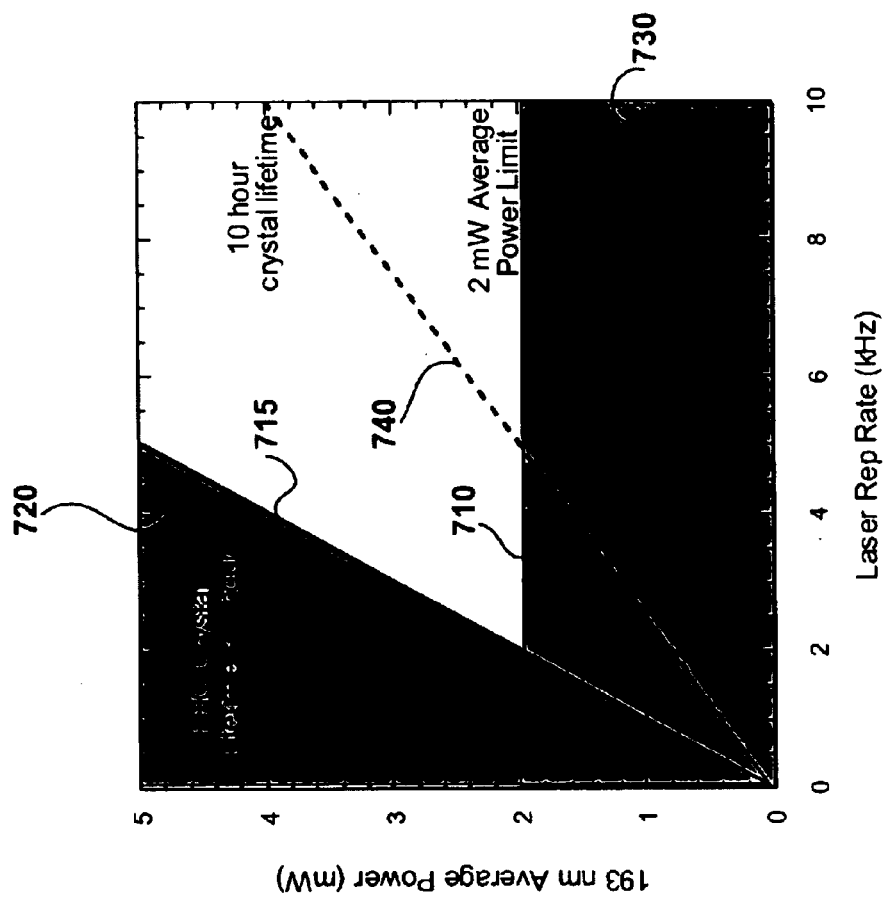
Figure 8:
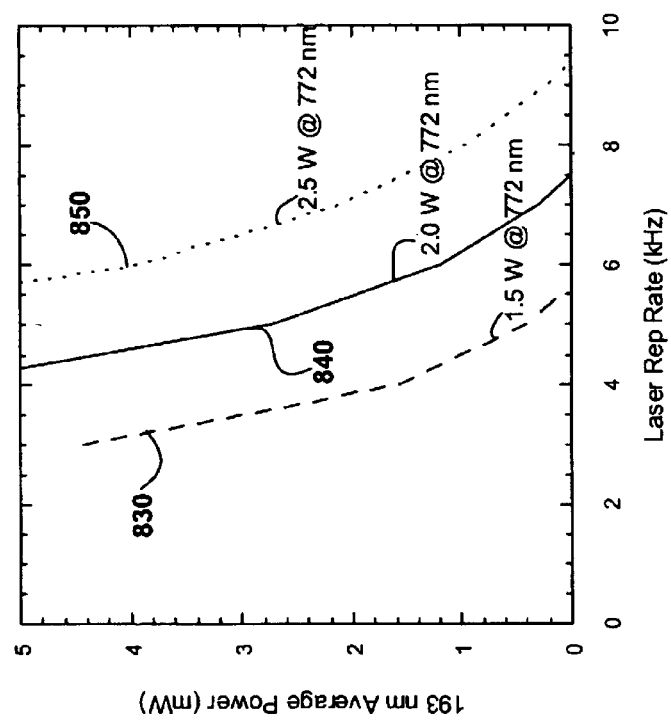
Figure 9:
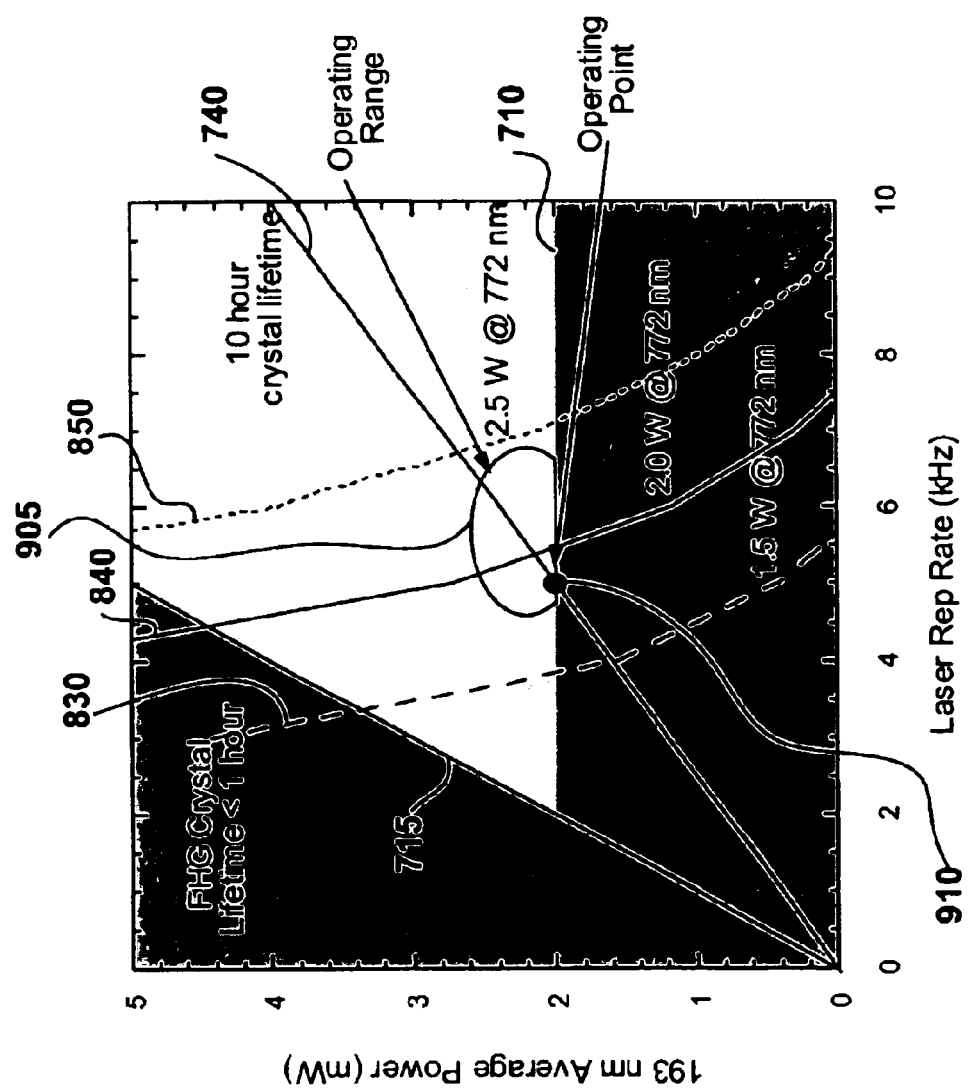
Figure 10:
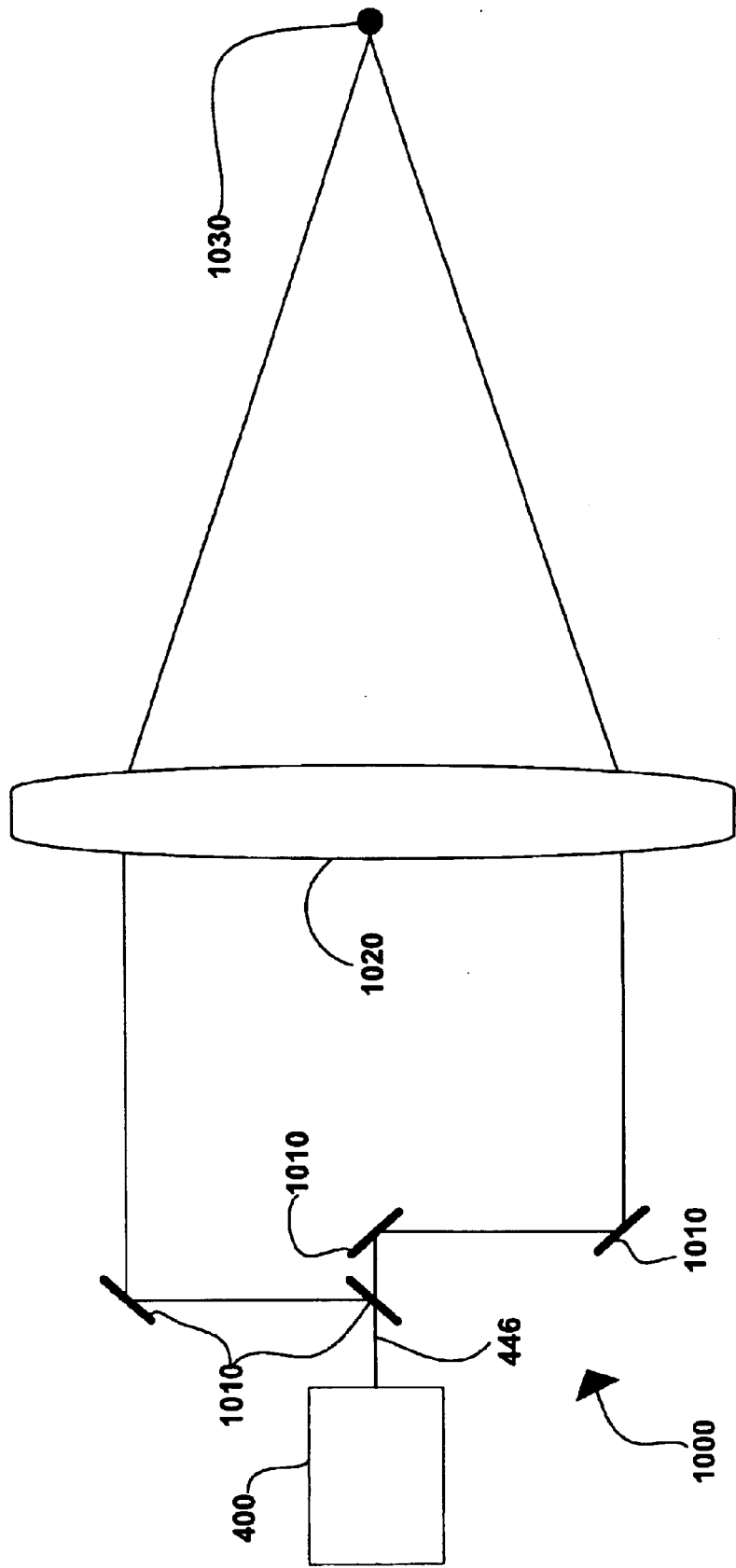

1) FIG. 1 illustrates a two step system for generating the fourth order harmonic of a laser beam, in accordance with an embodiment of the invention;

2) FIG. 2 illustrates a three step system for generating the fourth order harmonic of a laser beam, in accordance with an embodiment of the invention;

3) FIG. 3 illustrates a solid state oscillator seeded by a CW External Cavity Diode Laser, in accordance with an embodiment of the invention;

4) FIG. 4 illustrates a system for generating tunable laser light in the ultraviolet region in accordance with an embodiment of the invention;

5) FIG. 5 illustrates relationships between the components shown in FIG. 4 and other features of the system in accordance with an embodiment of the invention;

6) FIG. 6 illustrates alternative relationships between the components shown in FIG. 4 and other features of the system, according to an embodiment of the invention;

7) FIG. 7 illustrates an embodiment of the invention for optical testing;

8) FIG. 8 illustrates an embodiment of the invention for spectroscopy;

9) FIG. 9 illustrates an embodiment of the invention for wavelength calibration; and 10) FIG. 10 illustrates an embodiment of the invention used as a seed source for ultraviolet lasers.

Figure 11:
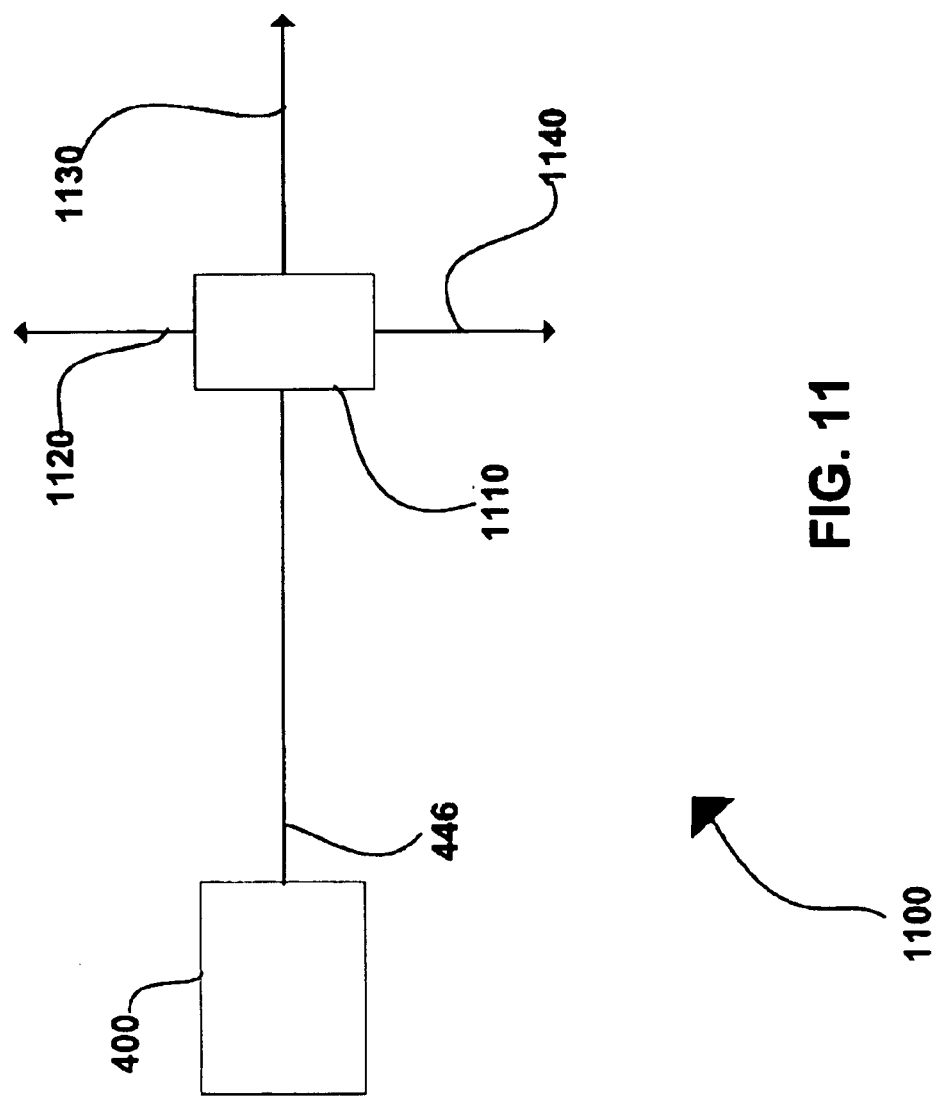

11) FIG. 11 illustrates an embodiment of the present invention configured for spectroscopy.

Figure 12:
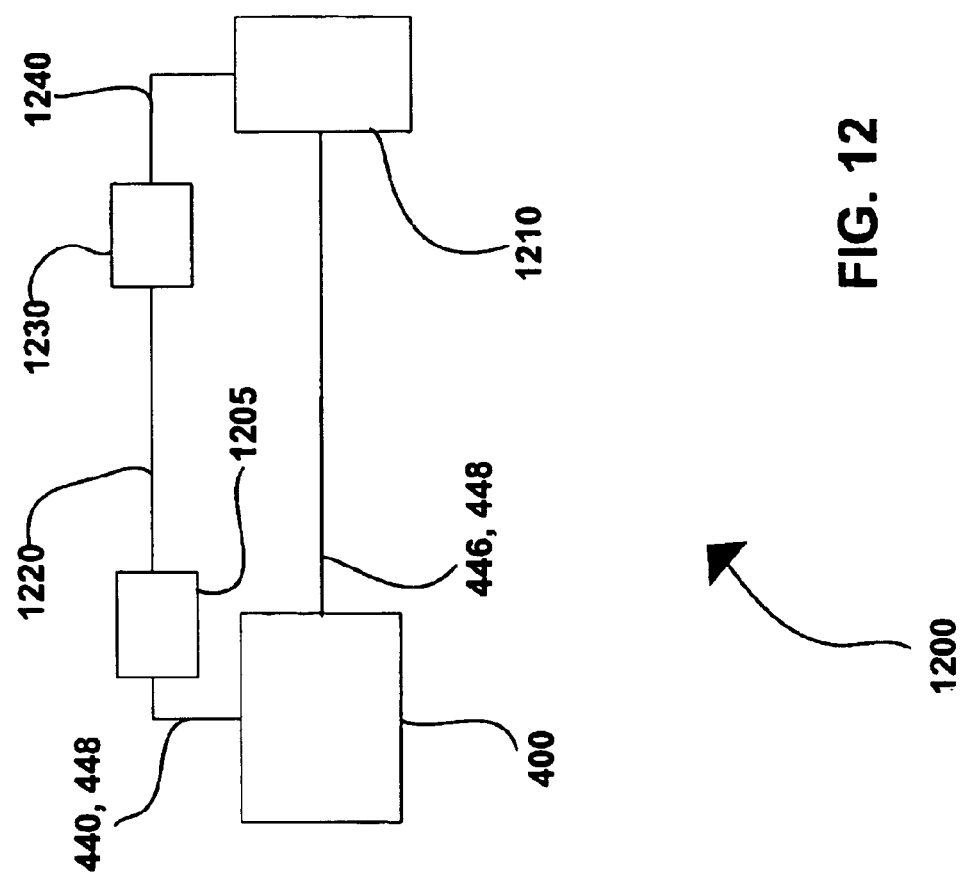

12) FIG. 12 illustrates an embodiment of the present invention configured for wavelength calibration.

Figure 13:
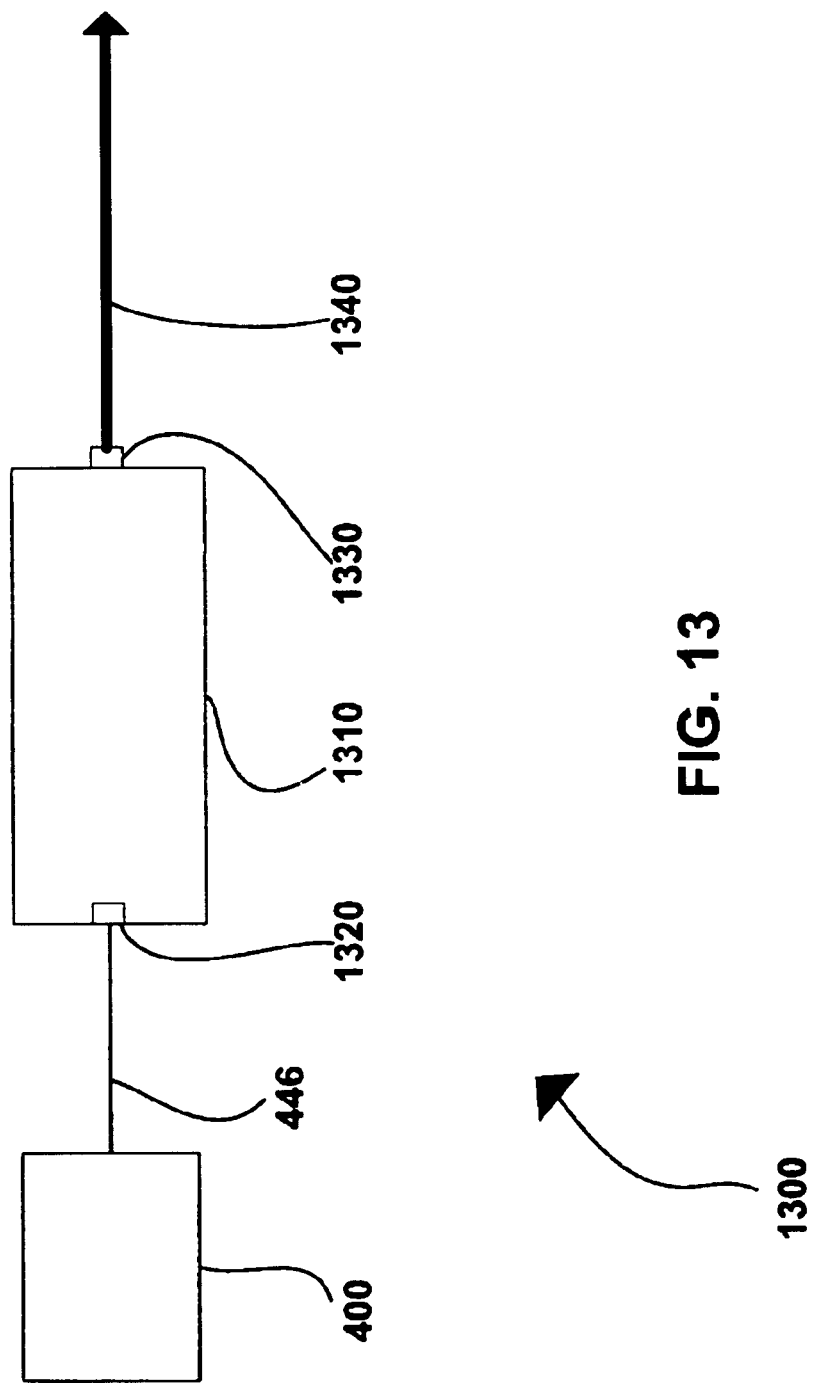

13) FIG. 13 illustrates an embodiment of the present invention wherein system 400 is configured as a seed source for an ultraviolet laser.

DETAILED DESCRIPTION OF THE INVENTION

The present invention includes the combination of a harmonic generation system with a tunable Ti:Sapphire pump system. As disclosed herein, this combination results in several unique and unforeseen advantages.

FIG. 1 shows a typical harmonic generation scheme, generally designated 100. An input light beam 110 is directed through a second harmonic generation optic (SHG) 115 that includes a birefringent crystal such as Lithium Niobate (LBO), Potassium Dihydrogen Phosphate (KDP), Barium Borate (BBO), or the like. When input light beam 110 is directed through SHG 115, a well known non-linear process causes generation of photons at exactly twice the frequency (half the wavelength) of the input photons. An output beam 120 of the SHG optic 115, therefore, includes light of the original wavelength $\lambda$ and second harmonic light at $\lambda/2$. This beam 120 is directed at a dichroic optic 125 that passes the $\lambda/2$ light resulting in beam 135 and reflects the remaining light of original wavelength $\lambda$ as beam 130. The $\lambda/2$ component beam 135 is then directed into a fourth harmonic generating optic FHG 140 where the frequency is again doubled to generate photons of wavelength $\lambda/4$. An output beam 145 from the FHG 140 is directed with optional steering optics 150 and separated into component beams 155 and 160, with wavelengths $\lambda/4$ and $\lambda/2$ respectively, using, for example, a prism 165.

The harmonic generation scheme shown in FIG. 1 requires birefringent optics with properties appropriate for the $\lambda$, $\lambda/2$, and $\lambda/4$ wavelengths. These properties include proper optical phase matching, transmission, and refractive index characteristics. When optics with the proper characteristics are not conveniently available other harmonic generation methods are employed.

FIG. 2 illustrates an example of an alternative harmonic generation method, generally designated 200. An input light beam 210, with wavelength $\lambda$, is directed into a SHG optic 212 to produce a beam 214 with components (photons) at wavelengths $\lambda$ and $\lambda/2$. The two components are separated using dichroic optic 216 to pass the $\lambda$ wavelength light as beam 218 and reflect $\lambda/2$ light as $\lambda/2$ beam 220. $\lambda/2$ beam 220 is directed along a path using steering optics 222 and 224 to a dichroic optic 226. Along this path a half-wave plate 228 is used to rotate the polarization of $\lambda/2$ beam 220 by 90 degrees. This rotation gives both $\lambda$ beam 218 and $\lambda/2$ beam 220 the same polarization. At dichroic optic 226 $\lambda/2$ beam 220 and $\lambda$ beam 218 are recombined into a single beam 232 and directed into a third harmonic generation optic (THG) 234. A resulting output beam 236 includes light at wavelengths of $\lambda$, $\lambda/2$, and $\lambda/3$. A dichroic 238 reflects the $\lambda/2$ and $\lambda/3$ components as beam 240 and passes the $\lambda$ component as beam 242. Beam 240 containing the second and third order harmonics (λ/2 and λ/3) is directed at a dichroic optic 244 that passes the second harmonic as beam 246 and reflects the third harmonic as a λ/3 beam 248. Dichroic optic 244 and optional steering optics 254 are used to direct λ/3 beam 248 through an additional half-wave plate 228 and to a dichroic 256 where it is recombined with the λ component beam 242 to generate an input beam 258 to a FHG optic 260. An output beam 262 from the FHG optic 260 includes light with wavelengths of λ, λ/3 and λ/4. The beam 262 is steered with optional optics 264 and can be separated into individual component beams λ/4 268, λ/3 270, and λ 272 with, for example, a prism 274.

While the harmonic generation systems shown in FIG. 1 and 2 produce up to the fourth harmonics using solid state crystals, alternative means of generating these and higher order harmonics using solid or fluid wavelength conversion media are known in the art. The two systems shown above are meant to be illustrative examples.

Alternative light sources in the IR (and NIR) region of the spectrum include externally pumped Ti:Sapphire lasers. These systems are tunable between approximately 700 and 1000 nm. Wavelength selection can be made through the use of gratings, prisms, or optically coupled master oscillators. FIG. 3 shows an example of a master oscillator geometry, generally designated 300. The lasing medium is a Ti:Sapphire crystal 305 located in a lasing cavity formed between a high reflector 310 and a partial reflector 315. A pump source 320 can be a laser or other light source with an output 325 having a frequency within the absorption band for the lasing transition of a desired oscillator output 345 produced at partial reflector 315. Typical pump sources 320 are frequency-doubled, flashlamp or diode pumped Nd lasers operating at repetition rates of tens to thousands of hertz (Hz). Lasing of the Ti:Sapphire crystal 305 generates a high intensity beam 330 between reflectors 310 and 315. The path length of beam 330 is controlled through movement of a prism 340 or reflectors 310 and 315. The shape of beam 330 can be optimized by placing optional optics, such as lens 335, in the cavity or by varying the shapes of reflectors 310 and 315.

A master oscillator (or seed laser) 350 is used for frequency selection and stabilization. The master oscillator 350 may be a continuous wave (CW) gas ion or external cavity diode laser. An output 355 of master oscillator 350 is normally directed into an optical isolator 360. This device acts as a "light diode" that allows light to pass in only one direction, thus protecting master oscillator 350 from light generated within the main lasing cavity. The beam is directed using optional optics 365 to the back of the total reflector 310. When the length of the main laser cavity, defined by the path length between reflectors 310 and 315, is an exact multiple of the wavelength of the master oscillator output 355, the energy from the master oscillator output 355 is coupled into the main lasing cavity. This locks a longitudinal mode of the main lasing cavity and can limit the wavelength of the oscillator output 345 to a transform-limited distribution centered on the wavelength of master oscillator output 355. The system may include a variety of electronic controls. Light source 320 and master oscillator 350 can include, for example, electronic control systems 370 and 375. These systems are optionally internally or peripherally connected via couplings 380 and 385.

FIG. 4 illustrates an embodiment of the invention including a system, generally designated 400, producing tunable ultraviolet light within the approximate frequency range of 187 nm to 330 nm as well as other wavelengths. The lasing medium is a Ti:Sapphire crystal 402 located between a high reflector 404 and a partial reflector 406, that form a main lasing cavity. A pump source 408 is a laser or other light source generating output beam 410. Lasing of Ti:Sapphire crystal 402 generates a high intensity beam 412 between high reflector 404 and partial reflector 406. The path length of high intensity beam 412 is controlled through movement of an optional prism 414 or reflectors 404 and 406. To optimize the shape of output beam 410, the shapes of the high reflector 404 and partial reflector 406 are optionally varied or optional optics, such as lens 416, are positioned in the main lasing cavity. Optional mechanical devices, such as piezoelectric translators 418, 420, and 422, are used to position reflectors 404 and 406 and prism 414

A master oscillator (or seed laser) 424 is used for frequency selection and stabilization. Master oscillator 424 is optionally a continuous wave (CW) external cavity diode laser. In alternative embodiments of the invention the master oscillator 424 is replaced or augmented by an intracavity grating or laser cavities employing alternative geometries. Output beam 426, from master oscillator 424, is directed into an optional optical isolator 428 and, using optional optics 430, is further directed to the back of total reflector 404. The main laser cavity's length is manipulated using translators 418, 420, and 422 such that the length of the cavity is an exact multiple of the wavelength of output beam 426. This condition injection locks high intensity beam 412 within the main lasing cavity to the wavelength of the output beam 426. System 400 also includes a variety of electronic controls. For example, light source 408 and master oscillator 424 optionally include electronic control systems 432 and 434 internally or peripherally connected via coupling means 436 and 438, which are, for example, wires.

In a typical embodiment, injection-seeding using master oscillator 424 establishes a preferential laser mode within the laser cavity. This preferential mode overwhelms the lasing process which builds up the laser signal from spontaneously emitted photons. Thus injection seeding can reduce the spectral bandwidth as much as 5 orders of magnitude, forcing the laser, defined by the main lasing cavity, to operate with a single frequency at the transform-limited bandwidth dictated by the pulse width of a main lasing cavity output beam 440. The injection-seeding process results in a reduced laser build-up time. The laser build-up time represents the elapsed time measured from when a pump source 408 generated pulse reaches the gain medium to when the oscillator pulse is observed.

The injection-seeding process works when the oscillator optical path length is matched to the wavelength of output beam 426. In one embodiment this condition is maintained using an analog closed-loop control system (not shown) optionally including electronic controls 434. The laser oscillator build-up time is monitored using photodiodes 439 to measure the arrival of the pump pulse and the generation of the oscillator pulse. These two measurements are used to create an electrical signal representing the laser build-up time. For example, in one embodiment, a pulse width-to-voltage converter generates a voltage that is proportional to the laser build-up time. This voltage is then compared to the build-up time of the following laser pulse. A proportional-integral-derivative (PID) amplifier circuit (not shown) generates an error signal used to maintain the minimum laser build-up time, resulting in effective injection-locking. The error signal is amplified a low-noise high voltage amplifier (not shown). The amplified signal is the input to a control loop actuator that changes the optical path length of the laser cavity. The control loop actuator optionally includes one or more of piezoelectric translators 418, 420, or 422, or the like.

Main lasing cavity output beam 440 is produced at partial reflector 406. The wavelength of output beam 440 is transform-limited and centered on the wavelength of master oscillator output 426. Output beam 440 is directed with optional steering optics 442 into a harmonic generator (HG) 444. Examples of harmonic generation systems are shown in FIGS. 1 and 2. Harmonic generator 444 optionally has a plurality of outputs 448 and 446, one of which includes fourth or higher order harmonics. At least one output 446 of harmonic generator 444 is a required output of UV generation system 400. Harmonic generator 444 or parts thereof are optionally enclosed in a vacuum chamber or controlled atmosphere environment. As new wavelength conversion methods are developed it is anticipated that they will be used to expand the capabilities of harmonic generator 444.

Outputs 448, optionally including light whose wavelength is at the first ($\lambda$), second ($\lambda/2$), or third ($\lambda/3$) harmonic of input beam 440, are utilized in embodiments of the invention. For example, in one embodiment output 448, or output 446, is directed into a monitoring device 450 such as a wavemeter, power meter, or the like. These devices enable frequency and power measurements that provide feedback through electrical means 452 to optimize the performance of system 400. A property, such as wavelength or intensity, of output 446 is optionally controlled by measuring output beam 440 or output 448. A personal computer or other processor (not shown) is optionally used to control or enhance this feedback process. Frequency measurements are used to compensate for frequency drift by adjusting the drive control voltage of the master oscillator 424 or the positions of cavity optics 404, 414, and 406. Feedback is optionally applied directly to translators 418, 420, and 422. Likewise, power measurement is optionally used to compensate for power drift by adjusting the drive voltage of light source 408.

Use of outputs 448 to monitor frequency and power levels can be advantageous. Since the power of a higher harmonic is highly dependent on the power of output beam 440 and pump beam 410, monitoring the power of either outputs 448 or 446, which are closer in wavelength to output 446 then are oscillator output 440 and pump beam 410, allows for more precise monitoring of the power of output beam 440 and pump beam 410. Monitoring of outputs 448 or 446 optionally provides a signal used to control the performance of HG 444. Monitoring of outputs 448 or 446 can also provide a more accurate indication of the power stability of output 446 than monitoring the power of output beam 440 and pump beam 410. Measurements of the wavelength of beams 448 or 440 can provide a precise wavelength measurement of the output 446 since these wavelengths are exact harmonics of each other. In various embodiments wavelength calibration standards in the IR and visible wavelength regions are used to monitor wavelengths of outputs in the UV region.

In various embodiments outputs 446 and 448 are generated at pulse repetition rates greater than or equal to 10, 50, 100, 500, 1000, 5000, 10000, 20000, and 50000 Hz. In one embodiment output beam 440 is within 20 percent of a theoretical transform limit determined by its pulse width. In various embodiments outputs 446 or 448 are at least tunable over ranges of 192 to 194 nm, 192 to 197 nm, 240 to 250 nm, and over a range greater than or equal to 2 nm, 4 nm, or 90 picometers. In various embodiments outputs 446 or 448 include light with a wavelength less than 333, 265, 255, 250, 225, 205, 204, 200, 197 and 194 nm. In various embodiments output 446 has a time average power greater than 2, 5, 7 and 10 mW.

In several embodiments of system 400 components are mechanically isolated from each other. FIG. 5 illustrates a configuration wherein the main laser oscillator (OSCL) 550 is physically isolated from the pump system (PUMP) 510, seed source (SEED) 520, HG 444, and any associated peripherals 530 such as electronics or pumps. PUMP 510 includes pump source 408 and associated electronics. SEED 520 includes master oscillator 424, electronics 432 and 434, and optics 428 and 430. Isolation occurs by placing the components on separate platforms 540 and 560 mechanically coupled through vibration damping means 570. Vibration damping means 570 limits the transfer of vibrations to platform 560. Limiting vibrations increases the wavelength stability of oscillator 550 and thus the wavelength stability of output 446. Vibration damping means 570 can include components that actively or passively respond to counteract or dampen vibrations. These components can be elastomeric, visco-elastic, piezoelectric or pneumatic devices.

FIG. 6 illustrates an alternative embodiment in which a platform 660 supports both OSCL 550 and parts of HG 444. Other components 510, 520, and 530 are placed on a separate platform 640 mechanically coupled to platform 660 through vibration damping means 570. This arrangement is possible since HG 444 is configurable to have no vibration sources. In this embodiment OSCL 550 and HG 444 can be temperature stabilized as a single unit.

The physical arrangements illustrated in FIGS. 5 and 6 advantageously allow combined electronics systems or cooling systems to be used for the PUMP 510 and SEED 520 components. These arrangements are illustrative and alternative arrangements of the elements shown in FIG. 6 are envisioned and within ths scope of the invention.

With continued reference to FIGS. 4, 5 and 6, in certain embodiments of PUMP 510 the pump source 408 is a Q-switched, frequency doubled, diode pumped Nd:YLF laser with a repetition rate equal to or above 10, 1000, 5000, 10,000 or 50,000 Hz. In one embodiment of SEED 520 master oscillator 424 includes a CW external cavity diode laser.

Operation of PUMP 510 at high repetition rates enables a reduction in the energy of individual pulses while still maintaining the total average power. This reduction dramatically extends the lifetime of optics, such as fourth harmonic crystals, within harmonic generator 444 and provides a significant advantage over prior art systems. In some prior art systems fourth harmonic crystals are repositioned as damage occurs at specific locations. Damage reduces wavelength conversion efficiency and this repositioning is, therefore, required to maintain average power output. Extension of optic lifetimes is a benefit of several embodiments of the present invention. For example, in one embodiment a 1 milliwatt (time average energy) is directed into a solid state fourth harmonic optic, such as FHG optic 140 or 260, in a fixed position relative to the pulsed light. The position of the optic is optionally held fixed during the generation of more than 10,000,000 laser pulses without substantial damage (damage that reduces the harmonic conversion efficiency below that required to maintain a desired average output power) to the solid state fourth harmonic optic. In various embodiments of the invention the solid state fourth harmonic optic is held fixed for the generation of more than 50,000,000, 100,000,000, 250,000,000 or 500,000,000 laser pulses without substantial damage. Embodiments of system 400 are entirely solid-state. Solid state designs are typically more stabile and easier to use relative to non-solid state systems as found in the prior art.

In several embodiments of the invention the use of high (laser pulse) repetition rates provides further unexpected results regarding production of fourth harmonic light. In one example a lifetime of a solid state fourth harmonic optic, such as FHG optic 140 or 260, is extended relative to the prior art during production of light at 193 nm. This lifetime is extended while maintaining the average power of the 193 nm light at or above 2 mW. In various embodiments the lifetime of the solid state fourth harmonic optic is extended to more than 10,000,000, 50,000,000, 100,000,000, 250,000,000 or 500,000,000 laser pulses without a need to translate the solid state fourth harmonic optic relative to the laser light.

By increasing the laser repetition rate, higher average powers are achieved without significantly reducing the lifetime of a solid state fourth harmonic optic. The repetition rates and average power output of prior art systems are limited by the pump lasers and oscillators used. Embodiments of the invention provide new and unique combinations of pulse power output and repetition rate. Increases in repetition rate (at constant average power) result in non-linear increases in solid state fourth harmonic optic lifetimes. The beneficially non-linear aspect of the lifetime increase is a result of the non-linear process of wavelength conversion that occurs in the solid state fourth harmonic optic.

FIGS. 7 through 9 illustrate an example of operational conditions included in several embodiments of the invention. These figures also illustrate how an increase in repetition rate can result in an even greater increase in a solid state fourth harmonic optic's lifetime.

FIG. 7 illustrates the relationship of two critical laser parameters, 193 nm average power output and the laser pulse repetition rate. The x-axis could alternatively be expressed in units of power per pulse, with higher powers per pulse being to the left of the axis. Shown in FIG. 7 are boundary conditions set by a typical commercial requirement of 2 mW 193 nm output power 710 and a effective crystal (i.e. solid state fourth harmonic optic) lifetime line 715 of one hour. The shaded areas 720 and 730 represent a parameter space that is not acceptable under typical commercial laser performance requirements. In FIG. 7, operating to the lower right of the area above 2 mW power boundary 710 is optimal for crystal lifetime. The 2 mW value is an illustrative example and alternative 193 nm output power requirements are envisioned. A "10 hour crystal lifetime" line 740 is also illustrated. Conditions to the right of this line will result in crystal (solid state fourth harmonic optic) lifetimes greater than 10 hrs.

FIG. 8 illustrates the average power output at 193 nm for embodiments of system 400 including 1.5 W, 2.0 W and 2.5 W oscillators as a function of laser repetition rate (or laser pulse power). The oscillator outputs are at 772 nm. These power functions are labeled 830, 840, and 850 respectively. These particular powers are shown for illustrative purposes, oscillators with alternative output powers are within the scope of the invention. As anticipated, higher 772 nm power results in higher 193 nm power at the expense of system cost (2.5 W oscillators being more expensive than 1.5 W oscillators). The relationship between laser repetition rate and 193 nm average power output is non-linear because the wavelength conversion processes that takes place in the solid state fourth harmonic optic are non-linear.

FIG. 9 shows an overlay of FIGS. 7 and 8. The intersection of the 2.0 W @ 772 nm power function 840 with the 2 mW average 193 power limit 710 identifies an area within an operating range 905 including an operating point 910. Operation to the right of operating point 910 leads to longer crystal lifetimes than operation to the right of operating point 910. Various embodiments of the invention includes operating within a range such as operating range 905. In part, because of the shape of power functions 830, 840, and 850, an increase in laser repetition rate, at constant 193 nm average power, results in a proportionally greater increase in solid state fourth harmonic optic lifetime. This advantage, included in several embodiments of the invention, is also observed at wavelengths other than 193 nanometers.

In various embodiments of the present invention system 400 is coupled with additional components to facilitate specific applications. Several examples of these embodiments are shown in FIGS. 10 through 13.

FIG. 10 illustrates an embodiment of the present invention configured for optical testing. This embodiment includes an optical testing system generally designated 1000. System 400 produces output beam 446 that is optionally split and directed by optional steering optics 1010. Beam 446 passes through an optic to be tested 1020 and is detected at a detector 1030. Optionally, beam 446 is of 193 or 248 nm light and the optic to be tested 1020 is used in conjunction with ArF or KrF Excimers or other gas lasers. This embodiment provide high quality beam or beams that may be used for testing excimer laser optics.

FIG. 11 illustrates an embodiment of the present invention configured for spectroscopy. This embodiment includes a spectroscopy system, generally designated 1100, in which output beam 446 of system 400 is directed at a sample 1110. Characteristics of sample 1110 are determined by monitoring transmitted light 1130, scattered, diffracted, and/or fluorescent light 1120, or material 1140 removed from sample 1110. Sample 1110 is optionally modified by output beam 446 through ablation, ionization, chemical reaction, vaporization, or the like. The monitoring optionally occurs as the wavelength of output 446 is varied in a continuous or stepwise manner. Embodiments of spectroscopy system 1100 can include one or more of an adsorption spectroscopy system, an emission spectroscopy system, and a mass spectroscopy system configured to receive light 1120, 1130 or material 1140. The system illustrated in FIG. 11 is alternatively used for laser machining.

FIG. 12 illustrates an embodiment of the present invention configured for wavelength calibration. This embodiment includes a wavelength standard system, generally designated 1200, in which system 400 is employed as a wavelength standard in the ultraviolet region. Since outputs 448 and 446 of the HG 444 are exact harmonics (e.g. $\lambda$, $\lambda/2$, $\lambda/3$, and $\lambda/4$) of the input beam 440 wavelength ($\lambda$), wavelength measurements of the longer wavelengths provide precise wavelength values for the shorter (UV) wavelength outputs. Precise wavelength measurements in the UV are desirable since tunable wavelength standards and calibration systems are typically only available in the visible and infrared regions of the spectrum.

In one embodiment of wavelength standard system 1200, a calibrated IR or visible wavelength measuring device 1205 is used to determine the wavelength $\lambda$ or $\lambda/2$ of output beam 440, output 446 or output 448. The wavelength of $\lambda/3$ or $\lambda/4$ is calculated and the outputs 446 or 448 at these wavelengths are used to calibrate one or more other wavelength measurement devices 1210, such as a wavelength calibration reference. Measuring devices 1205 can have associated electrical connections 1240, a controller 1230, and feedback 1220 to the wavelength measuring device 1205 or system 400. Inclusion of controller 1230 enables automatic and/or continuous calibration.

FIG. 13 illustrates an embodiment of the present invention wherein system 400 is configured as a seed source for an ultraviolet laser. This embodiment includes a seed system, generally designated 1300, in which the output 446 of system 400 is employed as a seed for an ultraviolet laser 1310, such as an KrF or ArF excimer, $N_2$ laser, or the like. In the prior art output beams from these types of lasers typically have relatively wide frequency profiles in comparison to output beams from solid state lasers. In one embodiment of the present invention the bandwidth of output beam 1340 is narrowed by introducing output 446 into the cavity of ultraviolet laser 1310. The seed beam is optionally introduced through cavity optics such as 1320 and 1330. Narrowing the bandwidth of an ultraviolet laser 1310 can produce a unique combination of high power and narrow line width not previously available in the ultraviolet. Accordingly, embodiments of seed system 1300 are suited for high-resolution lithography techniques requiring ultraviolet light.

From the description of the various embodiments of the process and apparatus set forth herein, it will be apparent to one of ordinary skill in the art that variations and additions to the embodiments can be made without departing from the principles of the present invention.

What is claimed is:

1. A system for generating a pulsed light output having a wavelength in the ultraviolet spectrum comprising:

a tunable solid state laser for generating laser radiation;

a solid state pump laser generating a pulsed output for pumping the tunable solid state laser;

a seed laser generating laser radiation which is injected into the tunable solid state laser to lock the output of the tunable solid state laser to the wavelength of the laser radiation of the seed laser; and a harmonic generator including at least a second harmonic generating optic and a higher harmonic generating optic, wherein the harmonic generator converts the laser radiation from the tunable solid state laser into one of a fourth or fifth harmonic thereof and with the seed laser, pump laser and tunable solid state laser being configured so that the fourth or fifth harmonic output corresponds to a wavelength in the ultraviolet spectrum, said ultraviolet output being pulsed with a repetition rate of at least 5 kHz and having an average power of at least 2 mW.

2. A system as recited in claim 1 wherein said harmonic generator further includes a third harmonic generating crystal and wherein the output from the second and third harmonic crystals are combined in the higher harmonic crystal.

3. A system as recited in claim 1 wherein said tunable solid state laser is a Ti:Sapphire laser.

4. A system as recited in claim 1 wherein said seed laser is a CW diode laser.

5. A system as recited in claim 1 further comprising:

a first platform for supporting the tunable solid state laser; and a second platform for supporting the pump laser, said second platform being coupled to said first platform by a vibration damping means.

6. A system as recited in claim 5 wherein said vibration damping means actively responds to counteract vibrations.

7. A system as recited in claim 5 wherein said vibration damping means passively responds to counteract vibrations.

8. A system as recited in claim 5, wherein the second platform supports the seed laser and the harmonic generator.

9. A system for generating a pulsed light output having a wavelength in the ultraviolet spectrum comprising:

a tunable Ti-Sapphire laser for generating laser radiation;

a solid state pump laser generating a pulsed output for pumping the tunable laser;

a CW diode laser generating seed laser radiation which is injected into the tunable laser to lock the output of the tunable laser to the wavelength of the laser radiation of the seed laser; and a harmonic generator including at least a second harmonic generating optic and a higher harmonic generating optic, wherein the harmonic generator converts the laser radiation from the tunable laser into one of a fourth or fifth harmonic thereof and with the seed laser, pump laser and tunable laser being configured so that the fourth or fifth harmonic output corresponds to a wavelength in the ultraviolet spectrum, said ultraviolet output being pulsed with a repetition rate of at least 5 kHz and having an average power of at least 2 mW.

10. A system as recited in claim 9 wherein said harmonic generator further includes a third harmonic generating crystal and wherein the output from the second and third harmonic crystals are combined in the higher harmonic crystal.

11. A system as recited in claim 9 further comprising:

a first platform for supporting the tunable solid state laser; and a second platform for supporting the pump laser, seed laser and harmonic generator, said second platform being coupled to said first platform by a vibration damping means.

* * * * *